United States Patent [19]

Shibayama

[11] Patent Number: 5,570,155
[45] Date of Patent: Oct. 29, 1996

[54] FOCUSING LENS POSITION CONTROLLING APPARATUS FOR A VARIABLE FOCAL LENGTH LENS

[75] Inventor: Atsushi Shibayama, Kawasaki, Japan

[73] Assignee: Nikon Corporation, Tokyo, Japan

[21] Appl. No.: 266,546

[22] Filed: Jun. 28, 1994

[30]     Foreign Application Priority Data

Jul. 7, 1993  [JP]  Japan .................................. 5-168096
  Jul. 7, 1993  [JP]  Japan .................................. 5-168097

[51] Int. Cl.$^6$ ................................................ G03B 13/36
[52] U.S. Cl. ................................................ 396/82; 396/79
[58] Field of Search .................................... 354/400, 402; 359/698

[56]              References Cited

U.S. PATENT DOCUMENTS

| 4,043,642 | 8/1977 | Hirose et al. ........................... | 350/184 |
| 4,914,464 | 4/1990 | Azuma et al. ........................... | 354/400 |
| 5,181,061 | 1/1993 | Kawasaki et al. ...................... | 354/400 |
| 5,448,413 | 9/1995 | Kobayashi et al. ..................... | 359/698 |

FOREIGN PATENT DOCUMENTS

| 62-284317 | 12/1987 | Japan . |
| 1-201634 | 8/1989 | Japan . |
| 52-15226 | 4/1992 | Japan . |
| 5-113533 | 5/1993 | Japan . |

*Primary Examiner*—W. B. Perkey

[57]              ABSTRACT

A focusing lens position controlling apparatus for a variable focal length lens includes a variable focal length lens having a focusing lens group, a distance measuring device for measuring the object distance information to an object, a focal length detecting device for detecting the focal length information of the variable focal length lens, a first calculating device for calculating an operation coefficient from the output value from the focal length detecting device regarding the focal length information, and a second calculating device for calculating the amount of movement of the focusing lens group from the output value from the distance measuring device regarding the object distance information and the operation coefficient.

15 Claims, 6 Drawing Sheets

FOCUSING LENS POSITION CONTROLLING APPARATUS FOR A VARIABLE FOCAL LENGTH LENS

BACKGROUND OF THE INVENTION

1. Field of the Invention

This invention relates to a focusing lens position controlling apparatus for a variable focal length lens, and particularly to a focusing lens position controlling apparatus for an auto focus camera and an auto focus video camera containing a zoom lens of the rear focus type or the inner focus type therein.

2. Related Background Art

In recent years, it has been commonly practised to carry a zoom lens and an auto focusing function on a still camera or a video camera. If a zoom lens of the rear focus type or the inner focus type is adopted as a zoom lens carried on such a camera, it will become possible to make the focusing lens group thereof small and thus, the entire camera can be made compact, and this is preferable. However, the amount of axial movement of the focusing lens group of such a zoom lens differs not only depending on the object distance but also depending on the focal length and therefore, it has been impossible to obtain an accurate amount of axial movement by methods used in conventional auto focus cameras (for example, (1) a method of memorizing the corresponding table of the amount of axial movement of the lens corresponding to the object distance; or (2) a method of memorizing the relation between the object distance and the amount of axial movement of the lens as an operation expression; in this case, it is usual that the operation expression is a quadratic polynomial regarding the inverse number of the object distance). For example, methods of controlling the position of the focusing lens group of a zoom lens of the rear focus type or the inner focus type are proposed in Japanese Patent Application Laid-open No. 62-284317, Japanese Patent Application Laid-open No. 1-201634 (corresponding U.S. Pat. No. 4,914,464), Japanese Patent Application Laid-open No. 5-113533, etc.

However, the method disclosed in the aforementioned Japanese Patent Application Laid-open No. 62-284317 suffers from the disadvantage that it is necessary to memorize a curve prescribing the relation between the focal length and the amount of axial movement of the focusing lens, for a plurality of object distances, it is necessary to make the number of distance divisions great if an attempt is made to obtain high focusing accuracy also when the focal length of the zoom lens is extended, and an enormous memory capacity becomes necessary if an attempt is made to memorize the curve of the relation between the focal length and the amount of axial amount for respective photographing distances.

Also, in the method disclosed in the aforementioned U.S. Pat. No. 4,914,464, the relation between the object distance and the amount of axial movement at a reference focal length and the conversion factor for each focal length have been memorized, and at a certain focal length, a conversion coefficient corresponding to this focal length and the amount of axial movement at the reference focal length have first been found, and these have been calculated to thereby find the actual amount of axial movement of the focusing lens group. However, an attempt to make the number of divisions of the focal length greater with the tendency of the zoom lens toward higher magnification would give rise to the disadvantage that the number of conversion coefficients memorized for each focal length becomes greater and a large memory capacity becomes necessary.

Also, in the method disclosed in Japanese Patent Application Laid-open No. 5-113533, a specific coefficient for calculating the amount of axial movement for each focal length has been memorized, and the amount of axial movement of the focusing lens group has been found from this specific coefficient and the object distance by calculation. Again in this method, however, an attempt to make the number of divisions of the focal length greater with the tendency of the zoom lens toward higher magnification would give rise to the disadvantage that the number of specific coefficients memorized for each focal length becomes greater and a large memory capacity becomes necessary.

SUMMARY OF THE INVENTION

The present invention has as its object the provision of a focusing lens position controlling apparatus for a variable focal length lens which, even when the number of divisions of the object distance and the number of divisions of the focal length are both made great, makes a memory capacity small and makes focusing with high accuracy possible.

An embodiment of the present invention is a focusing lens position controlling apparatus for a variable focal length lens which is provided with a variable focal length lens having a focusing lens group, a distance measuring unit for measuring the object distance information to an object, a focal length detecting means for detecting the focal length information of the variable focal length lens, and first and second calculating unit wherein in the first calculating unit, an operation coefficient is calculated in conformity with the output value of the focal length detecting unit and in the second calculating unit, the amount of movement of the focusing lens group is calculated from the output value of the distance measuring unit and the operation coefficient.

Further, a zoom lens of the rear focus type or the inner focus type is suitable as the variable focal length lens to which the present invention is applied, and the distance measuring unit applied to the present invention may desirably be a distance measuring unit of the non-TTL type.

Also, it is desirable that in the first calculating unit, the operation coefficient be calculated by a polynomial having the output value of the focal length detecting unit as a variable.

More desirably, the present embodiment has at least two focal-length changing areas and polynomials corresponding to each focal-length changing area, and in the first calculating unit, it is desirable in improving to accuracy of focusing the judge a focal-length changing area from the output value of the focal length detecting unit, and substitute the output value of the focal length detecting unit for a polynomial corresponding to the pertinent focal-length changing area, thereby calculating the operation coefficient.

Also, in the second calculating unit, it is desirable to substitute the output value of the distance measuring unit for a polynomial having as a coefficient the operation coefficient found by the first calculating unit, thereby calculating the amount of movement of the focusing lens group.

According to another embodiment of the present invention, a focusing lens position controlling apparatus for a variable focal length lens is provided with a variable focal length lens having a focusing lens group, a distance measuring unit for measuring the object distance information to an object, a focal length detecting unit for detecting the focal length information of the variable focal length lens, and a calculating unit wherein in the calculating unit, a conversion coefficient is calculated from the detection value of the focal length detecting unit, the reference amount of movement of the focusing lens group is calculated from the output value of the distance measuring unit, and the reference amount of movement is multiplied by the conversion coefficient to thereby calculate the amount of movement of the focusing lens group.

Further, a zoom lens of the rear focus type or the inner focus type is suitable as the variable focal length lens to which the present embodiment is applied, and the distance measuring unit applied to the present embodiment may desirably be a distance measuring unit of the non-TTL type.

Also, it is desirable that in said calculating unit, the reference amount of movement of the focusing lens group be calculated by a polynomial having the output value of the distance measuring unit as a variable.

Also, it is desirable that in the calculating means, a conversion coefficient be calculated by a polynomial having the detection value of the focal length detecting unit as a variable.

More desirably, the present embodiment has at least two focal-length changing areas and polynomials corresponding to each focal-length changing area, and in the calculating unit, it is desirable in improving for accuracy of focusing the judge a focal-length changing area from the detection value of the focal length detecting unit, and substitute the detection value of the focal length detecting unit for a polynomial corresponding to the pertinent focal-length changing area, thereby calculating the conversion coefficient.

DESCRIPTION OF THE PREFERRED EMBODIMENTS

Some embodiments of the present invention will hereinafter be described.
[Embodiment 1]

Figure 1:
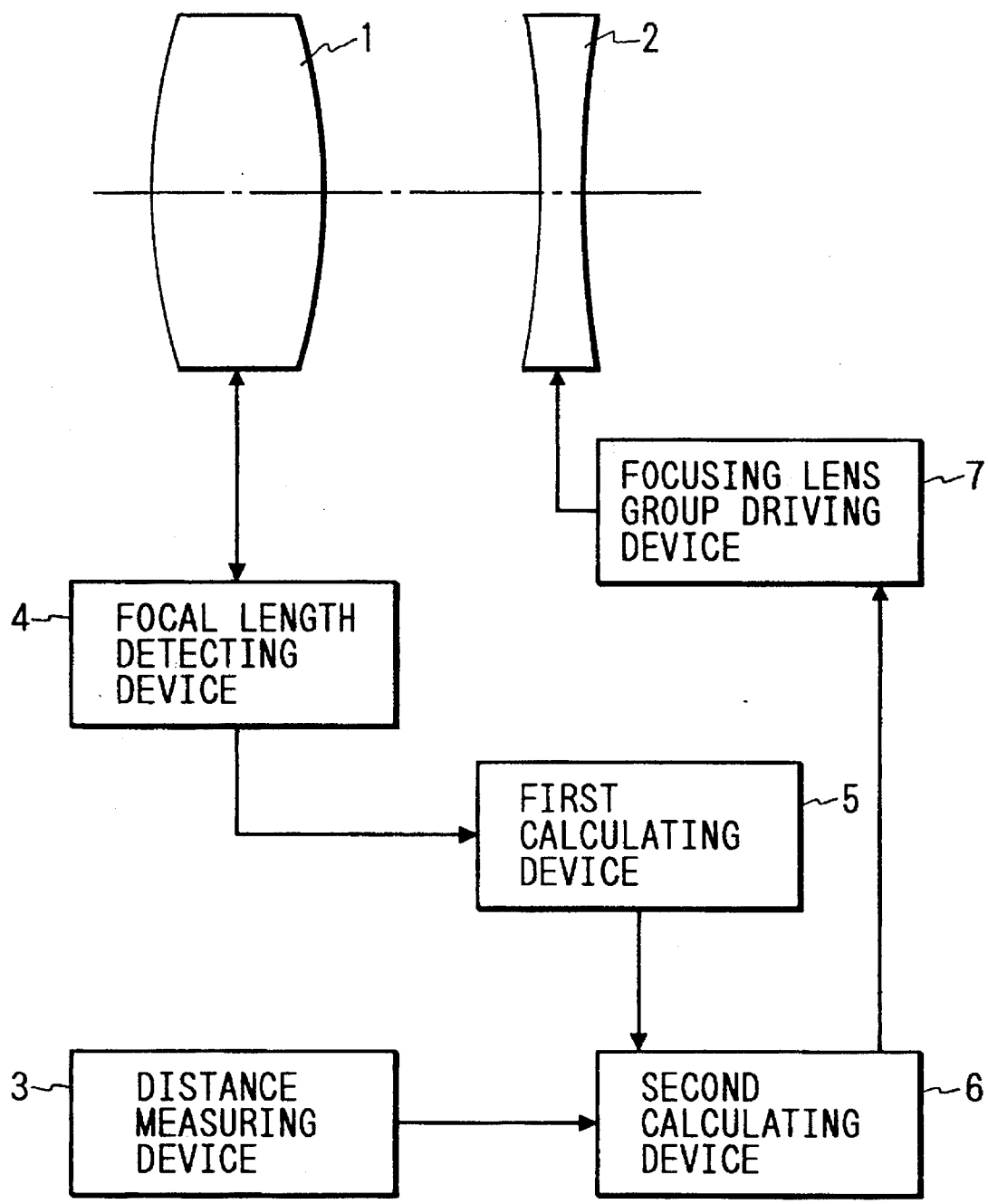
FIG. 1 is a block diagram for illustrating a first embodiment of the present invention.

FIG. 1 is a block diagram for illustrating a first embodiment of the focusing lens position controlling apparatus of the present invention. In FIG. 1, the reference numeral 1 designates a movable lens group movable during focal-length change, and the reference numeral 2 denotes a focusing lens group movable during focusing. At least the movable lens group 1 and the focusing lens group 2 together constitute a zoom lens. The reference numeral 3 designates a distance measuring device of the non-TTL type for projecting, for example, infrared rays onto an object, receiving the reflected light thereof and measuring the object distance by a trigonometrical distance measuring system. The reference numeral 4 denotes a focal length detecting device using, for example, an encoder for detecting the set position of the movable lens group 1. The output value of the focal length detecting device 4 is sent to a first calculating device 5, and the output value is substituted for a polynomial A stored in the first calculating device 5, whereby an operation coefficient a is calculated. It is desirable that at this time, two polynomials (polynomial A1 and polynomial A2) be stored in the first calculating device 5 and two operation coefficients (operation coefficient a1 and operation coefficient a2) corresponding to the respective polynomials be calculated. Further, the two operation coefficients calculated by the first calculating device 5 are sent to a second calculating device 6, in which a polynomial B having each operation coefficient as a coefficient is constituted, and the output value sent from the distance measuring device 3 is substituted for the polynomial B, thereby calculating the amount of movement of the focusing lens group 2. On the basis of this amount of movement, the focusing lens group 2 is driven by a focusing lens group driving device 7 using, for example, a pulse motor, thereby effecting focusing. The values of the various elements of the zoom lens used in the present embodiment are shown in Table 1 below. In Table 1, F represents the focal length of the zoom lens, F1 represents the focal length of the movable lens group 1, F2 represents the focal length of the focusing lens group 2, D represents the spacing between the principal points of the movable lens group 1 and the focusing lens group 2 in an infinity in-focus state, BF represents the spacing between the principal point of the focusing lens group 2 and image plane in the infinity in-focus state, and Z represents the output value by the focal length detecting device 4. The operation coefficients a1 and a2 calculated by the polynomials A1 and A2, respectively, are also shown in Table 1.

TABLE 1

| F = 63.1366 − 38.9993 | | | | | |
| F1 = 24.9954 | | | | | |
| F2 = −26.0043 | | | | | |
| F | Z | D | BF | a1 | a2 |
| --- | --- | --- | --- | --- | --- |
| 63.1366 | 0 | 9.2863 | 39.9306 | 0.0710900 | 0.724800 |
| 60.7452 | 1 | 9.6916 | 37.4153 | 0.0681441 | 0.724132 |
| 58.3166 | 2 | 10.1372 | 34.8597 | 0.0667140 | 0.731376 |
| 55.8456 | 3 | 10.6304 | 32.2565 | 0.0667999 | 0.746531 |
| 53.3238 | 4 | 11.1809 | 29.5960 | 0.0684016 | 0.769600 |
| 50.7357 | 5 | 11.8027 | 26.8642 | 0.0715192 | 0.800580 |
| 48.0536 | 6 | 12.5177 | 24.0392 | 0.0761527 | 0.839472 |
| 45.2442 | 7 | 13.3577 | 21.0892 | 0.0823021 | 0.886277 |
| 42.2568 | 8 | 14.3733 | 17.9636 | 0.0899673 | 0.940994 |
| 38.9993 | 9 | 15.6581 | 14.5688 | 0.0991485 | 1.003620 |

In the first calculating device 5, the operation coefficients a1 and a2 are calculated by the following polynomials A1 and A2:

| Polynomial A1: | Operation coefficient a1 = $7.57941 \times 10^{-4} \cdot Z^2 - 3.70386 \times 10^{-3} \cdot Z + 7.109 \times 10^{-2}$ |
| --- | --- |
| Polynomial A2: | Operation coefficient a2 = $3.95607 \times 10^{-3} \cdot Z^2 - 4.62437 \times 10^{-3} \cdot Z + 0.7248$ |

Although in the present embodiment, the polynomials A1 and A2 are quadratic expressions regarding Z, they may be linear expressions, tertiary expressions or higher order polynomials. When the order number of the polynomials is small, a higher speed of calculation and the saving of the memory capacity can be achieved, and when the order number of the polynomials is great, an improvement in the accuracy of focusing can be achieved.

When the inverse number S of the object distance is to be sent as the output value of the distance measuring device 3 to the second calculating device 6, the amount of movement X of the focusing lens group 2 is calculated in the second calculating device 6 by the following polynomial B. In the present embodiment, the movement of the focusing lens group 2 toward the image plane is positive.

Polynomial B:     amount of movement X of the focusing lens group = (operation coefficient a1) × $S^2$ + (operation coefficient a2) × S Although in the present embodiment, the polynomial B is a quadratic expression regarding the inverse number S of the object distance, it may be a linear expression, a tertiary expression or a higher order polynomial in conformity with requirements for the accuracy of focusing and the calculation speed. Also, 0-order term may be added. Further, the output value from the distance measuring device 3 is not limited to the inverse number of the object distance, but it will be good if the relation thereof with the object distance is a monotonous increase or a monotonous decrease. In the present embodiment, the number of divisions of the focal length is 10, but the output value from the focal length detecting device 4 may be selected to e.g., Z=0, 0.1, 0.2, . . . 1, 1.1, 1.2, . . . 8.9, 9, whereby it is possible to make the number of divisions of the focal length great without increasing the memory capacity.

Also, the first calculating device 5 and the second calculating device 6 can be constructed on one and the same CPU to thereby achieve the downsizing of the electronic circuit and the curtailment of the number of parts.

[Embodiment 2]

Figure 2:
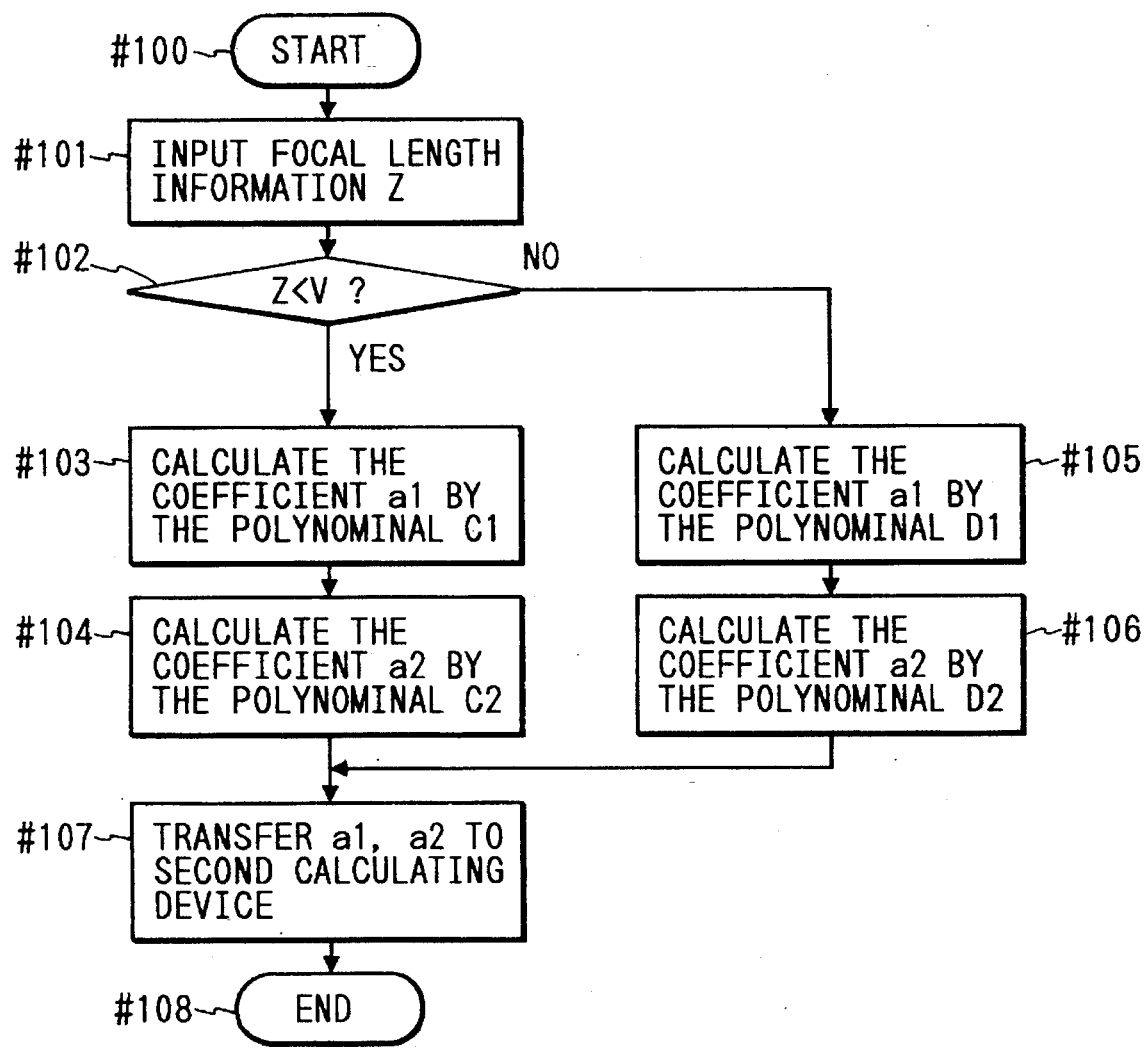
FIG. 2 is a flow chart for illustrating the operation of a first calculating device in a second embodiment of the present invention.

FIG. 2 is a flow chart for illustrating the operation of the first calculating device 5 in a second embodiment of the focusing lens position controlling apparatus of the present invention.

When a switch for starting the focusing operation (for example, the shutter release button of a still camera) becomes closed, the operation of the first calculating device 5 is started (step #100). At a step #101 immediately after the start, the output value Z from the focal length detecting device 4 is inputted. At the next step #102, the focal-length changing areas are judged and branching-off is effected for each focal-length changing area. Specifically, the output value Z from the focal length detecting device 4 is compared with a comparative value V, and when Z< V, the program branches off to a step #103, and when Z≧V, the program branches off to a step #105. By providing for a plurality of comparative values (V1, V2, . . . ), it is also possible to make the program branch off to three or more focal-length changing areas. At the step #103, the output value Z from the focal length detecting device 4 is substituted for a polynomial C1 to thereby calculate the operation coefficient a1, and at a step #104, the output value Z is substituted for a polynomial C2 to thereby calculate the operation coefficient a2. Also at the step #105 branching off from the step #102, the output value Z from the focal length detecting device 4 is substituted for a polynomial D1 to thereby calculate the operation coefficient a1, and at a step #106, the output value Z is substituted for a polynomial D2 to thereby calculate the operation coefficient a2. At a step #107 subsequent to the step #104 and step #106, the operation coefficients a1 and a2 are transferred to the second calculating device 6, thus terminating the operation.

Figure 3:
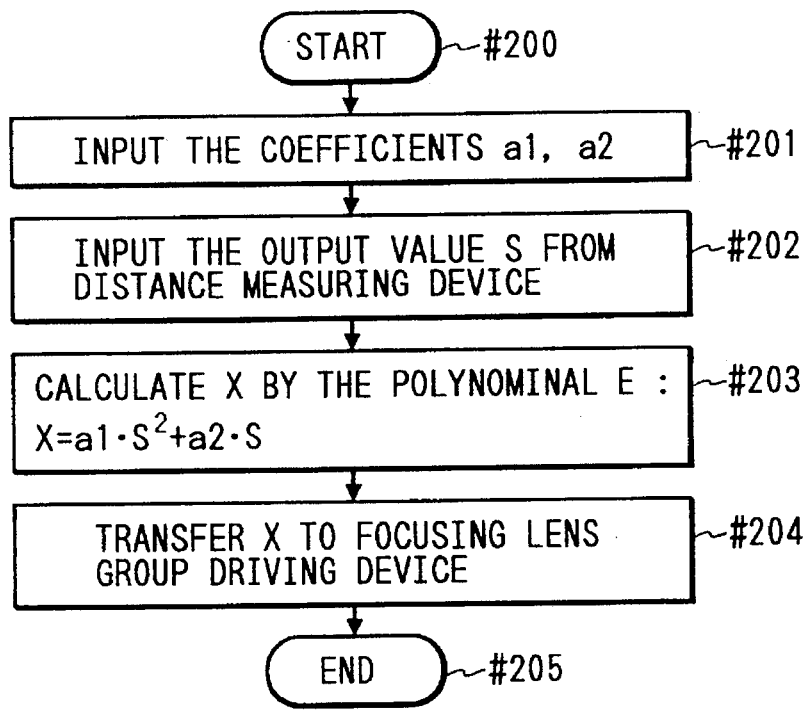
FIG. 3 is a flow chart for illustrating the operation of a second calculating device in the second embodiment of the present invention.

FIG. 3 is a flow chart for illustrating the operation of the second calculating device 6 in the second embodiment of the focusing lens position controlling apparatus of the present invention.

Figure 4:
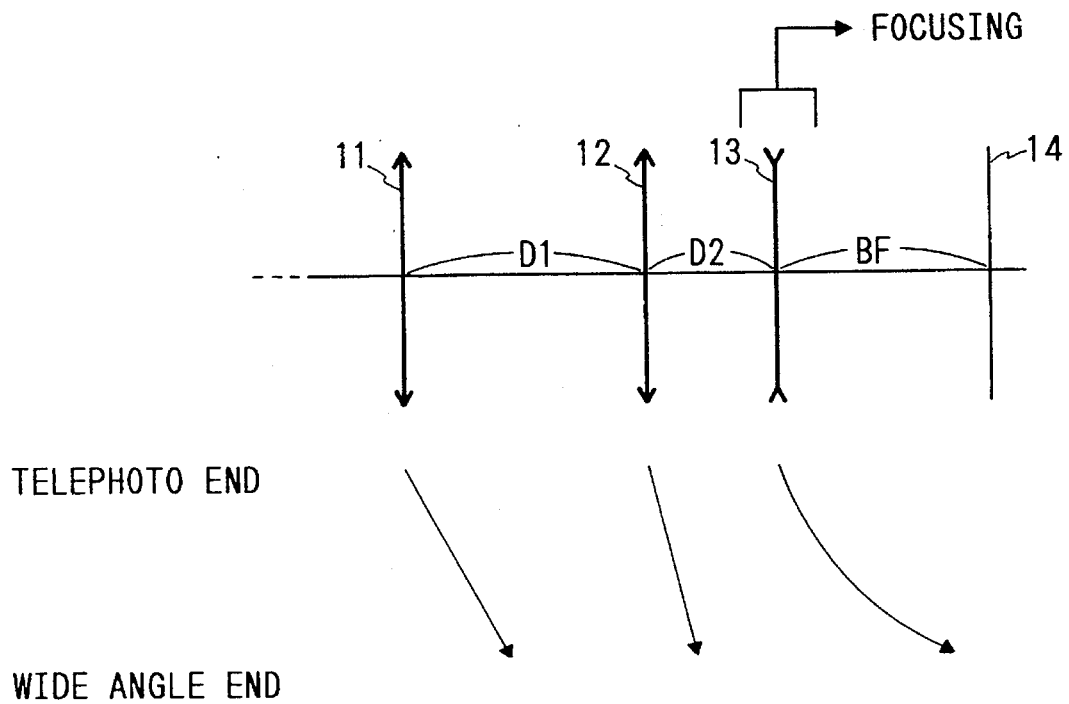
FIG. 4 is a schematic view of a zoom lens used in the present invention.

The second calculating device 6 starts its operation in operative association with the operation of the first calculating device 5 (step #200). At a step #201 immediately after the start, the operation coefficients a1 and a2 are inputted from the first calculating device 5. At the next step #202, the output value S is inputted from the distance measuring device 3. It is desirable that the output value S of the distance measuring device 3 be the inverse number of the object distance. At a step #203, a polynomial E is calculated from the operation coefficients a1, a2 and the output value S to thereby calculate the amount of movement X of the focusing lens group. The polynomial E specifically is a calculation indicated by X= a1·$S^2$+a2·S. At the next step #204, the amount of movement X of the focusing lens group is transferred to the focusing lens group driving device 7, thus terminating the operation (step #205). FIG. 4 is a schematic view of the zoom lens used in the focusing lens position controlling apparatus of the present invention. In FIG. 4, the reference numerals 11 and 12 designate movable lens groups, and the reference numeral 13 denotes a focusing lens group. The reference numeral 14 designates an imaging plane. During the zooming from the telephoto and to the wide angle end, the movable lens groups 11, 12 and the focusing lens group 13 are all moved toward the imaging plane. During the focusing from infinity to a short distance object, the focusing lens group 13 is moved toward the imaging plane to thereby effect focusing.

The values of the various elements of the zoom lens used in the present embodiment are shown in Table 2 below. In Table 2, F represents the focal length of the zoom lens, F1 represents the focal length of the movable lens group 11, F2 represents the focal length of the movable lens group 12, F3 represents the focal length of the focusing lens group 13, D1 represents the spacing between the principal points of the movable lens group 11 and movable lens group 12, D2 represents the spacing between the principal points of the movable lens group 12 and the focusing lens group 13 in an infinity in-focus state, BF represents the spacing between the principal point of the focusing lens group 13 and the imaging plane 14 in the infinity in-focus state, and Z represents the output value by the focal length detecting device. Operation coefficients a1 and a2 calculated by polynomials C1 and C2 or polynomials D1 and D2 are also shown in Table 2. The comparative value V for judging the focal-length changing areas is V=10.

TABLE 2

| F = 102.000 − 39.000 | | | | | | |
|---|---|---|---|---|---|---|
| F1 = 62.5784 | | | | | | |
| F2 = 31.3046 | | | | | | |
| F3 = −24.2472 | | | | | | |
| F | Z | D1 | D2 | BF | a1 | a2 |
| 102.000 | 0 | 34.1156 | −1.5475 | 51.2082 | .159714 | 1.15439 |
| 97.500 | 1 | 33.2353 | −1.0682 | 48.9416 | .152970 | 1.12723 |
| 93.000 | 2 | 32.3313 | −0.5659 | 46.6044 | .146705 | 1.10273 |
| 88.501 | 3 | 31.4039 | −0.0372 | 44.1929 | .140918 | 1.08090 |
| 84.000 | 4 | 30.4526 | 0.5226 | 41.7012 | .135609 | 1.06173 |

TABLE 2-continued $F = 102.000 - 39.000$
$F1 = 62.5784$
$F2 = 31.3046$
$F3 = -24.2472$

| F | Z | D1 | D2 | BF | a1 | a2 |
|---|---|----|----|----|----|----|
| 79.499 | 5 | 29.4780 | 1.1186 | 39.1264 | .130778 | 1.04522 |
| 75.000 | 6 | 28.4815 | 1.7571 | 36.4651 | .126426 | 1.03137 |
| 70.499 | 7 | 27.4641 | 2.4471 | 33.7092 | .122552 | 1.02018 |
| 65.999 | 8 | 26.4289 | 3.1988 | 30.8560 | .119156 | 1.01166 |
| 61.501 | 9 | 25.3798 | 4.0264 | 27.8986 | .116239 | 1.00580 |
| 57.000 | 10 | 24.3222 | 4.9493 | 24.8282 | .115970 | 1.01622 |
| 52.499 | 11 | 23.2656 | 5.9925 | 21.6398 | .112189 | 1.02572 |
| 48.000 | 12 | 22.2241 | 7.1913 | 18.3266 | .123945 | 1.07135 |
| 43.500 | 13 | 21.2180 | 8.5983 | 14.8769 | .151238 | 1.15310 |
| 39.000 | 14 | 20.2807 | 10.2907 | 11.2817 | .194068 | 1.27097 |

In the first calculating device, when the output value Z of the focal length detecting device is in the focal-length changing area of Z< V (V=10), the operation coefficients a1 and a2 are calculated by the following polynomials C1 and C2:

| Polynomial C1: | Operation coefficient a1 = $2.39147 \times 10^{-4} \cdot Z^2 - 6.98288 \times 10^{-3} \cdot Z + 0.159714$ |
|---|---|
| Polynomial C2: | Operation coefficient a2 = $1.33112 \times 10^{-3} \cdot Z - 2.84905 \times 10^{-2} \cdot Z + 1.15439$ |

Also, when the output value Z of the focal length detecting device is in the focal-length changing area of $Z \geq V$ (V=10), the operation coefficients a1 and a2 are calculated by the following polynomials D1 and D2:

| Polynomial D1: | Operation coefficient a1 = $7.7686 \times 10^{-3} (Z-10)^2 - 1.15498 \times 10^{-2} \cdot (Z-10) + 0.11597$ |
|---|---|
| Polynomial D2: | Operation coefficient a2 = $1.80613 \times 10^{-2} \cdot (Z-10)^2 - 8.55697 \times 10^{-3} \cdot (Z-10) + 1.01622$ |

Although in the present embodiment, the polynomials C1, C2 and D1, D2 are all quadratic expressions regarding Z, they may be linear expressions, tertiary expressions or higher order polynomials. When the order number of the polynomials is small, a higher speed of calculation and the saving of the memory capacity can be achieved, and when the order number of the polynomials is great, an improvement in the accuracy of focusing can be achieved.

When the inverse number S of the object distance is to be sent as the output value from the distance measuring device 3 to the second calculating device 6, the amount of movement X of the focusing lens group 13 is calculated in the second calculating device 6 by the following polynomial E. In the present embodiment, the movement of the focusing lens group 13 toward image plane is positive.

| Polynomial E: | amount of movement X of the focusing lens group. <br> = (operation coefficient a1) × $S^2$ + (operation coefficient a2) × S |
|---|---|

Although in the present embodiment, the polynomial E is a quadratic expression regarding the inverse number S of the object distance, it may be a linear expression, a tertiary expression or a higher order polynomial in conformity with requirements for the accuracy of focusing and the calculation speed. Also, 0-order term may be added. Further, the output value from the distance measuring device 3 is not limited to the inverse number of the object distance, but its relation with the object distance can be a monotonous increase or a monotonous decrease. In the present embodiment, the number of divisions of the focal length is 15, but the output value from the focal length detecting device 4 may be Z=0, 0.1, 0.2, . . . 1.1, 1.2, . . . 13.9, 14, whereby it is possible to make the number of divisions of the focal length great without increasing the memory capacity.

[Embodiment 3]

Figure 5:
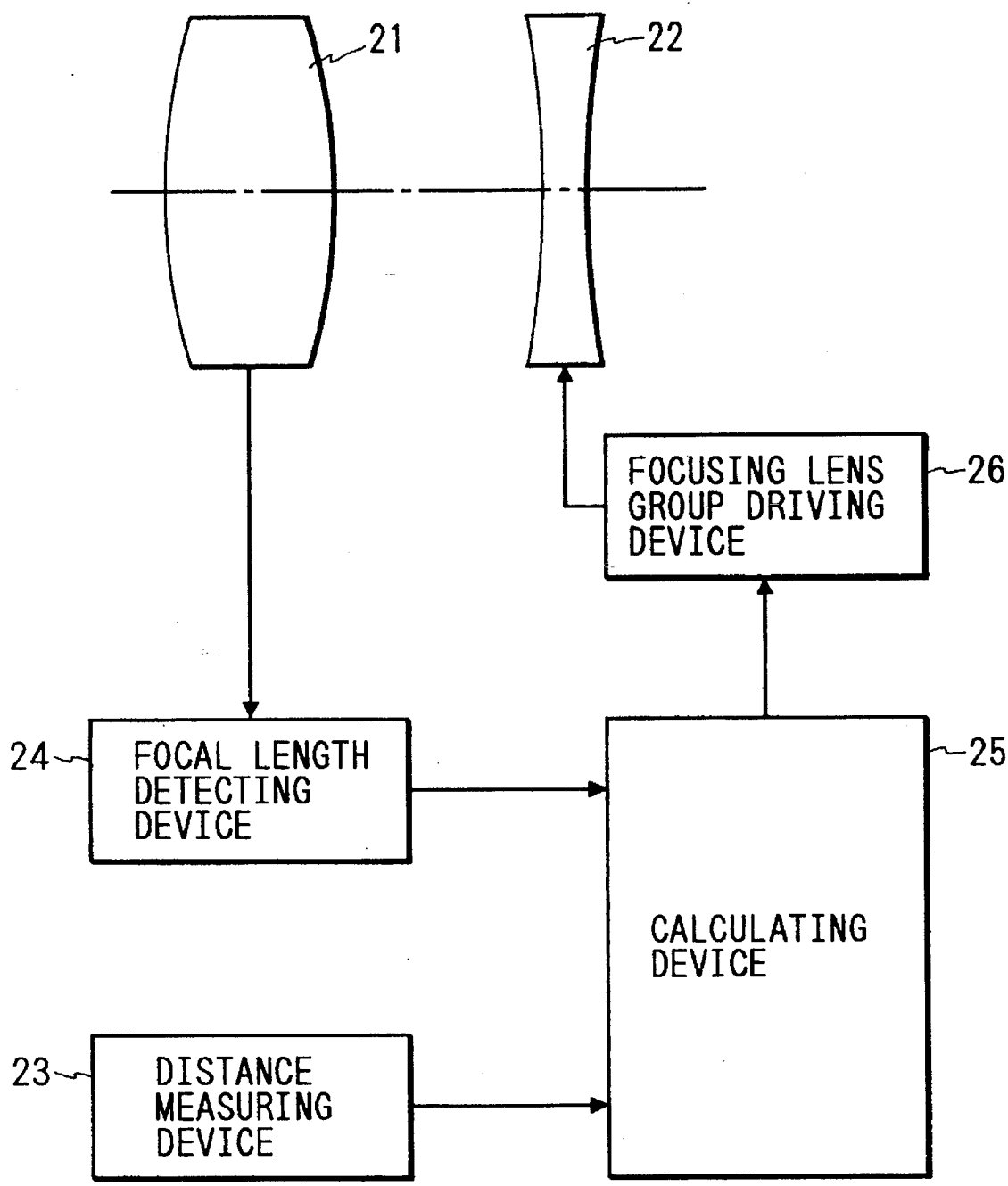
FIG. 5 is a block diagram for illustrating a third embodiment of the present invention.

FIG. 5 is a block diagram for illustrating a third embodiment of the focusing lens position controlling apparatus of the present invention. In FIG. 5, the reference numeral 21 designates a movable lens group movable during focal-length change, and the reference numeral 22 denotes a focusing lens group movable during focusing. At least the movable lens group 21 and the focusing lens group 22 together constitute a zoom lens. The reference numeral 23 designates a distance measuring device of the non-TTL type for projection, for example, infrared rays onto an object, receiving the reflected light thereof and measuring the object distance by the trigonometrical distance measuring system. The reference numeral 24 denotes a focal length detecting device using, for example, an encoder for detecting the set position of the movable lens group 21. The detection value Z of the focal length detecting device 24 is sent to a calculating device 25, and the detection value Z is substituted for a polynomial G stored in the calculating device 25 to thereby calculate a conversion coefficient K. On the other hand, an output value S is sent also from the distance measuring device 23 to the calculating device 25, and the output value S is substituted for a polynomial H stored in the calculating device 25 to thereby calculate the reference amount of movement L1 of the focusing lens group 22. Further, in the calculating device 25, the reference amount of movement L1 of the focusing lens group 22 is multiplied by the conversion coefficient K to thereby calculate the amount of movement LX of the focusing lens group 22 at the current focal length. On the basis of this amount of movement LX, the focusing lens group 22 is driven by a focusing lens group driving device 26 using, for example, a pulse motor, to thereby effect focusing.

Figure 6:
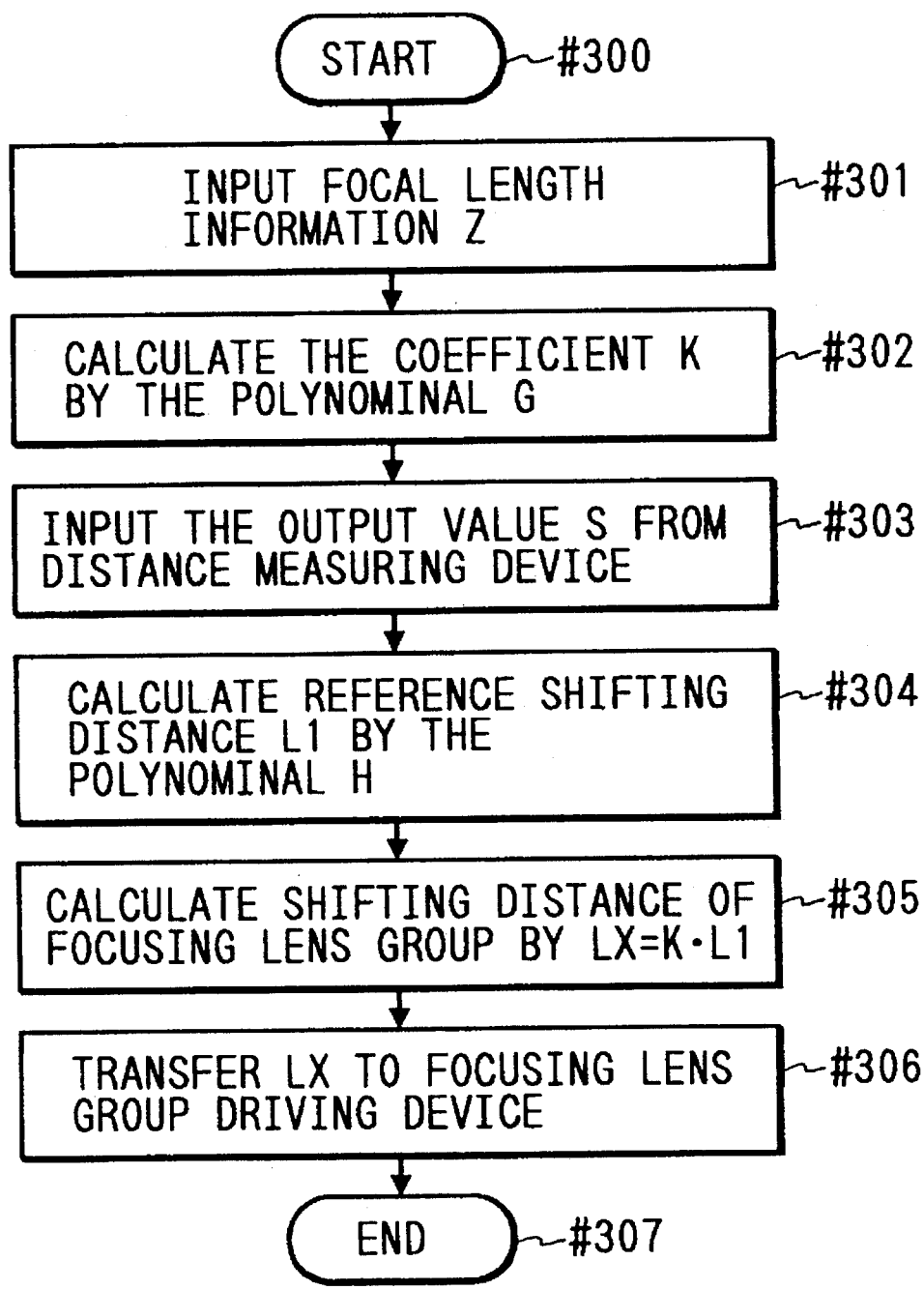
FIG. 6 is a flow chart for illustrating the operation of a calculating device in the third embodiment of the present invention.

FIG. 6 is a flow chart for illustrating the operation of the calculating device 25 in the third embodiment of the focusing lens position controlling apparatus of the present invention.

In FIG. 6, when a switch, not shown, for starting the focusing operation (for example, the shutter release button of a still camera) becomes closed, the operation of the calculating device 25 is started (step #300). At a step #301 immediately after the start, the detection value Z from the focal length detecting device 24 is inputted. At the next step #302, the detection value Z is substituted for a polynomial G stored in the calculating device 25 to thereby calculate the conversion coefficient K. At a step #303, the output value S from the distance measuring device 23 is inputted. It is desirable that the output value S from the distance measuring device 23 be the inverse number of the object distance. At the next step #304, the output value S is substituted for a polynomial H stored in the calculating device 25 to thereby calculate the reference amount of movement L1 of the focusing lens group 22. In the present embodiment, the polynomial H is a polynomial expressed by $L1 = b1 \cdot S^2 + b2 \cdot S$.

At a step #305, a calculation LX= K·L1 is effected to thereby calculate the amount of movement LX of the focusing lens group 22 at the current focal length. Further, at the next step #306, the amount of movement LX of the focusing lens group 22 is transferred to the focusing lens group driving device 26 thus terminating the operation (step #307).

The values of the various elements of the zoom lens used in the present embodiment are shown in Table 3 below. In Table 3, F represents the focal length of the zoom lens, F1 represents the focal length of the movable lens group 21, F2 represents the focal length of the focusing lens group 22, D represents the spacing between the principal points of the movable lens group 21 and the focusing lens group 22 in an infinity in-focus state, BF represents the spacing between the principal point of the focusing lens group 22 and image plane in the infinity in-focus state, and Z represents the detection value by the focal length detecting device 24. The conversion coefficient K calculated by the polynomial G is also shown in Table 3.

TABLE 3

F = 63.1366 – 38.9993
F1 = 24.9954
F2 = –26.0043

| F | Z | D | BF | K |
|---|---|---|---|---|
| 63.1366 | 0 | 9.2863 | 39.9306 | 1.00000 |
| 60.7452 | 1 | 9.6916 | 37.4153 | 1.01599 |
| 58.3166 | 2 | 10.1372 | 34.8597 | 1.02679 |
| 55.8456 | 3 | 10.6304 | 32.2565 | 1.03783 |
| 53.3238 | 4 | 11.1809 | 29.5960 | 1.05455 |
| 50.7357 | 5 | 11.8027 | 26.8642 | 1.08237 |
| 48.0536 | 6 | 12.5177 | 24.0392 | 1.12673 |
| 45.2442 | 7 | 13.3577 | 21.0892 | 1.19305 |
| 42.2568 | 8 | 14.3733 | 17.9636 | 1.28678 |
| 38.9993 | 9 | 15.6581 | 14.5688 | 1.41335 |

In the calculating device 25, the conversion coefficient K is calculated by the following polynomial G:

| Polynomial G: | Conversion coefficient K = $9.05355 \times 10^{-4} \cdot Z^3 -$ $5.31156 \times 10^{-3} \cdot Z^2 +$ $2.03975 \times 10^{-2} \cdot Z +$ $1.00000$ |
|---|---|

Although in the present embodiment, the polynomial G is a tertiary expression regarding Z, it may be a linear expression, a quadratic expression or a higher order polynomial. When the order number of the polynomial is small, a higher speed of calculation and the saving of the memory capacity can be achieved, and when the order number of the polynomial is great, an improvement in the accuracy of focusing can be achieved.

When the inverse number S of the object distance is to be sent as the output value of the distance measuring device 23 to the calculating device 25, the reference amount of movement L1 of the focusing lens group 22 is calculated in the calculating device 25 by the following polynomial H:

| Polynomial H: | Reference amount of movement L1 = $0.07109 \times S^2 +$ $0.7248 \times S$ |
|---|---|

Further, a calculation LX= K·L1 is executed to thereby calculate the amount of movement LX of the focusing lens group 22. In the present embodiment, the movement of the focusing lens group 22 toward the image plane is positive.

Although in the present embodiment, the polynomial H is a quadratic expression regarding the inverse number S of the object distance, it may be a linear expression, a tertiary expression or a higher order polynomial in conformity with requirements for the accuracy of focusing and the calculation speed. Also, 0-order term may be added. Further, the output value from the distance measuring device 23 is not limited to the inverse number of the object distance, but its relation with the object distance can be a monotonous increase or a monotonous decrease. In the present embodiment, the number of divisions of the focal length is 10, but the output value from the focal length detecting device 24 may be e.g., Z=0, 0.1, 0.2, ... 1, 1.1, 1.2, ... 8.9, 9, whereby it is possible to make the number of divisions of the focal length great without increasing the memory capacity.

[Embodiment 4]

Figure 7:
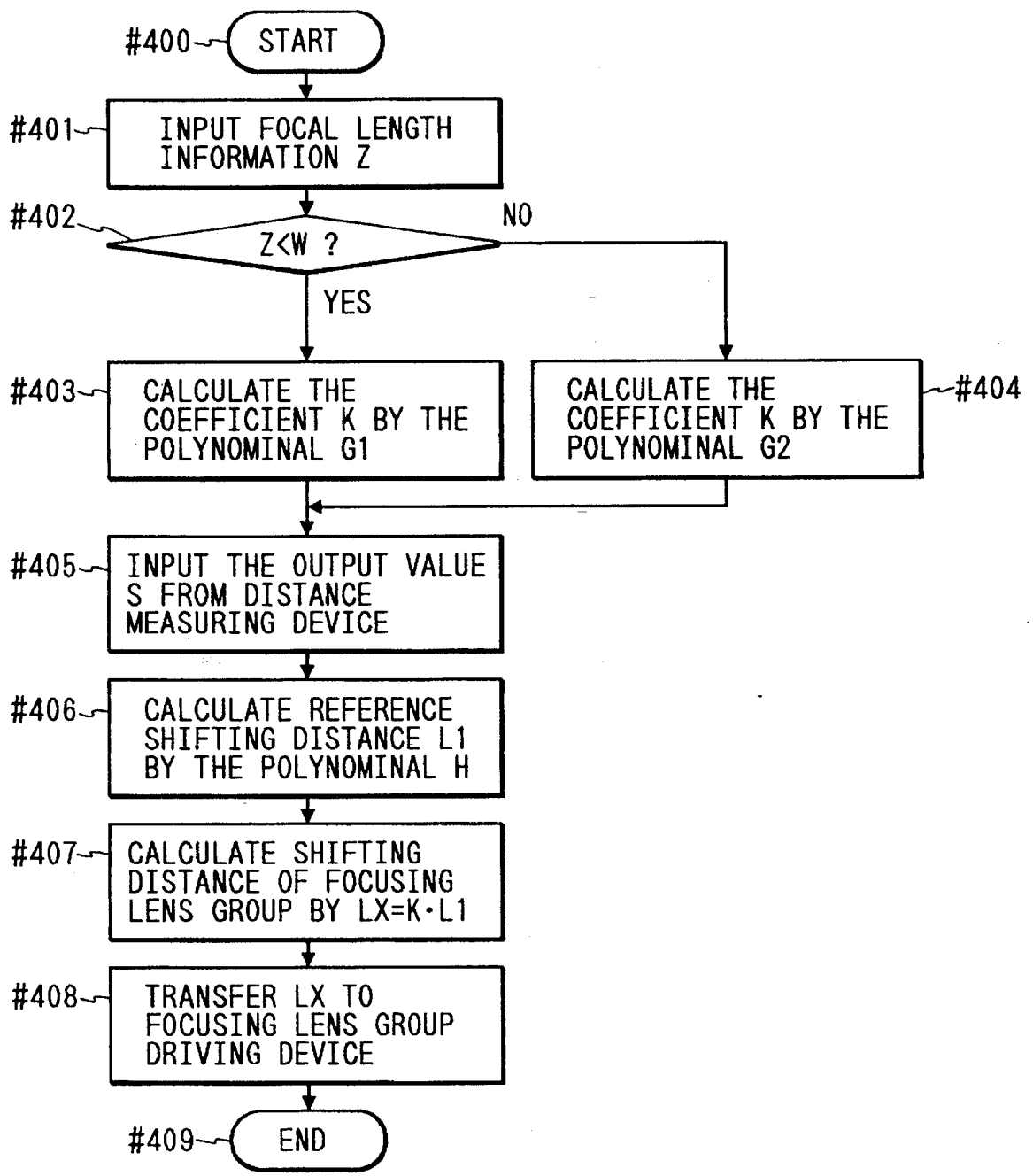
FIG. 7 is a flow chart for illustrating the operation of a calculating device in a fourth embodiment of the present invention.

FIG. 7 is a flow chart for illustrating the operation of the calculating device 25 in a fourth embodiment of the focusing lens position controlling apparatus of the present invention.

In FIG. 7, when a switch for starting the focusing operation (for example, the shutter release button of a still camera) becomes closed, the operation of the calculating device 25 is started (step #400). At a step #401 immediately after the start, the detection value Z from the focal length detecting device 24 is inputted. At the next step #402, the focal-length changing areas are judged, and the program branches off for each focal-length changing area. Specifically, the detection value Z from the focal length detecting device 24 is compared with a comparative value W, and when Z< W, the program branches off to a step #403, and when Z≧W, the program branches off to a step #404. By providing for a plurality of comparative values (W1, W2, ... ), it is also possible to make the program branch off to three or more focal-length changing areas. At the step #403, the detection value Z from the focal length detecting device 24 is substituted for a polynomial G1 stored in the calculating device 25 to thereby calculate the conversion coefficient K. Also, at the step #404 branching off from the step #402, the detection value Z from the focal length detecting device 24 is substituted for a polynomial G2 stored in the calculating device 25 to thereby calculate the conversion coefficient K. At a step #405 subsequent to the step #403 and the step #404, an output value S is inputted from the distance measuring device 23. It is desirable that the output value S of the distance measuring device 23 be the inverse number of the object distance. At a step #406, the output value S is substituted for a polynomial H stored in the calculating device 25 to thereby calculate the reference amount of movement L1 of the focusing lens group. In the present embodiment, the polynomial H is a polynomial expressed by L1= b1·S²+b2·S. At the next step #407, a calculation LX= K·L1 is effected to thereby calculate the amount of movement of the focusing lens group at the current focal length. Further, at the next step #408, the amount of movement LX of the focusing lens group is transferred to the focusing lens group driving device 26, thus terminating the operation (step #409).

The zoom lens in the focusing lens position controlling apparatus of the fourth embodiment is also similar to that shown in FIG. 4.

The values of the various elements of the zoom lens used in the present embodiment are shown in Table 4 below. In Table 4, F represents the focal length of the zoom lens, F1 represents the focal length of the movable lens group 11, F2 represents the focal length of the movable lens group 12, F3 represents the focal length of the focusing lens group 13, D1 represents the spacing between the principal points of the movable lens group 11 and the movable lens group 12, D2 represents the spacing between the principal points of the movable lens group 12 and the focusing lens group 13 in an infinity in-focus state, BF represents the spacing between the principal point of the focusing lens group 13 and the imaging plane 14 in the infinity in-focus state, and Z represents the detection value by the focal length detecting device 24. The conversion coefficient K calculated by the polynomial G1 or the polynomial G2 is also shown in Table 4. The comparative value W for judging the focal-length changing areas is W=10.

TABLE 4

F = 102.000 – 39.000
F1 = 62.5784
F2 = 31.3046
F3 = –24.2472

| F | Z | D1 | D2 | BF | K |
|---|---|---|---|---|---|
| 102.000 | 0 | 34.1156 | –1.5475 | 51.2082 | 1.000000 |
| 97.500 | 1 | 33.2353 | –1.0682 | 48.9416 | 0.974073 |
| 93.000 | 2 | 32.3313 | –0.5659 | 46.6044 | 0.950542 |
| 88.501 | 3 | 31.4039 | –0.0372 | 44.1929 | 0.929406 |
| 84.000 | 4 | 30.4526 | 0.5226 | 41.7012 | 0.910666 |
| 79.499 | 5 | 29.4780 | 1.1186 | 39.1264 | 0.894321 |
| 75.000 | 6 | 28.4815 | 1.7571 | 36.4651 | 0.880371 |
| 70.499 | 7 | 27.4641 | 2.4471 | 33.7092 | 0.868817 |
| 65.999 | 8 | 26.4289 | 3.1988 | 30.8560 | 0.859658 |
| 61.501 | 9 | 25.3798 | 4.0264 | 27.8986 | 0.852894 |
| 57.000 | 10 | 24.3222 | 4.9493 | 24.8282 | 0.860500 |
| 52.499 | 11 | 23.2656 | 5.9925 | 21.6398 | 0.864661 |
| 48.000 | 12 | 22.2241 | 7.1913 | 18.3266 | 0.908567 |
| 43.500 | 13 | 21.2180 | 8.5983 | 14.8769 | 0.992218 |
| 39.000 | 14 | 20.2807 | 10.2907 | 11.2817 | 1.115610 |

When the detection value Z of the focal length detecting device 24 is in the focal-length changing area of Z< W (W=10), at the step #403, the conversion coefficient K is calculated by the following polynomial G1:

| Polynomial G1: | Conversion coefficient K = $1.19769 \times 10^{-3} \cdot Z^2 - 2.71243 \times 10^{-2} \cdot Z + 1.00000$ |
|---|---|

Also, when the detection value Z of the focal length detecting device is in the focal-length changing area of Z≧ W (W=10), at the step #404, the conversion coefficient K is calculated by the following polynomial G2:

| Polynomial G2: | Conversion coefficient K = $1.98726 \times 10^{-2} \cdot (Z-10)^2 - 1.57119 \times 10^{-2} \cdot (Z-10) + 0.86050$ |
|---|---|

Although in the present embodiment, the polynomial G1 and the polynomial G2 are quadratic expressions regarding Z, they may be linear expressions, tertiary expressions or higher order polynomials. When the order number of the polynomials is small, a higher speed of calculation and the saving of the memory capacity can be achieved, and when the order number of the polynomials is great, an improvement in the accuracy of focusing can be achieved.

When the inverse number S of the object distance is to be sent as the output value from the distance measuring device 23 to the calculating device 25, the following polynomial H is executed at the step #406 to thereby calculate the reference amount of movement L1 of the focusing lens group 13.

| Polynomial H: | Reference amount of movement L1 = $0.159714 \times S^2 + 1.15439 \times S$ |
|---|---|

Further, at the step #407, a calculation LX= K·L1 is executed to thereby calculate the amount of movement LX of the focusing lens group 13. In the present embodiment, the movement of the focusing lens group 13 toward the image plane is positive.

Although in the present embodiment, the polynomial H is a quadratic expression regarding the inverse number S of the object distance, it may be a linear expression, a tertiary expression or a higher order polynomial in conformity with requirements for the accuracy of focusing and the calculation speed. Also, 0-order term may be added. Further, the output value from the distance measuring device is not limited to the inverse number of the object distance, but its relation with the object distance can be a monotonous increase or a monotonous decrease. In the present embodiment, the number of divisions of the focal length is 15, but the output value from the focal length detecting device may be e.g. Z=0, 0.1, 0.2, . . . 1, 1.1, 1.2, . . . 13.9, 14, whereby it is possible to make the number of divisions of the focal length great without increasing the memory capacity.

Thus, according to the present invention, thence can be achieved a focusing lens position controlling apparatus for a variable focal length lens which, even when the number of divisions of the object distance and the number of divisions of the focal length are both made great, makes the memory capacity small and makes focusing of high accuracy possible.

What is claimed is:

1. A focusing lens position controlling apparatus adapted for use with a variable focal length lens, comprising:

a variable focal length lens having a focusing lens group;

a non-TTL type distance measuring unit measuring an object distance to an object;

a focal length detecting unit detecting a focal length of said variable focal length lens;

a first calculating unit calculating an operation coefficient from an output value from said focal length detecting unit by using a polynomial expression wherein an output value from said focal length detecting unit is a variable, said operation coefficient relating to said focal length; and a second calculating unit calculating an amount of movement of said focusing lens group based on an output value from said distance measuring unit and said operation coefficient.

2. An apparatus according to claim 1, wherein said variable focal length lens is a zoom lens of a rear focus type or an inner focus type.

3. An apparatus according to claim 1, further comprising focal-length changing areas and polynomial expressions corresponding to respective ones of said focal-length changing areas, and wherein said first calculating unit judges a focal-length changing area from said output value of said focal length detecting unit, and substitutes said output value from said focal length detecting unit for a polynomial expression corresponding to said judged focal-length changing area to thereby calculate said operation coefficient.

4. An apparatus according to claim 1, wherein said second calculating unit substitutes the output value from said distance measuring unit for the polynomial expression having as a coefficient the operation coefficient calculated by said first calculating unit to thereby calculate an amount of movement for said focusing lens group.

5. An apparatus according to claim 1, wherein said first calculating unit and said second calculating unit are formed integrally with each other.

6. An apparatus according to claim 1, wherein said output value relating to said focal length represents a number given to each focal length obtained by dividing a portion between the focal length of said variable focal length at a telephoto end thereof and the focal length thereof at a wide angle end thereof into a predetermined number.

7. An apparatus according to claim 1, wherein said output value regarding said object distance is an inverse number of said object distance.

8. An apparatus according to claim 1, wherein said output value relating to said object distance is a value monotonously increasing or monotonously decreasing in proportion to said object distance.

9. A focusing lens position controlling apparatus adapted for use with a variable focal length lens, comprising:

a variable focal length lens having a focusing lens group;

a non-TTL type distance measuring unit measuring an object distance from said variable focal length lens to an object, and in response, generating a first output value;

a focal length detecting unit detecting a focal length of said variable focal length lens, and in response, generating a second output value; and a calculating unit calculating a conversion coefficient from the second output value from said focal length detecting unit by using a polynomial expression wherein the second output value from said focal length detecting unit is a variable, calculating a reference amount of movement of said focusing lens group from the first output value from said distance measuring unit regarding said object distance, and multiplying said reference amount of movement by said conversion coefficient to thereby calculate an amount of movement for said focusing lens group.

10. An apparatus according to claim 9, wherein said variable focal length lens is a zoom lens of a rear focus type or an inner focus type.

11. An apparatus according to claim 9, wherein said calculating unit calculates said reference amount of movement based on another polynomial expression having an output value of said distance measuring unit as a variable thereof.

12. An apparatus according to claim 9, further having at least two focal-length changing areas and polynomial expressions corresponding to respective ones of said focal-length changing areas, and wherein said calculating unit judges a focal-length changing area from the second output value of said focal length detecting unit, and substitutes the second output value of said focal length detecting unit for the polynomial expression corresponding to said judged focal-length changing area to thereby calculate said conversion coefficient.

13. An apparatus according to claim 9, wherein said output value regarding said focal length represents a number given to each focal length obtained by dividing a portion between the focal length of said variable focal length lens at a telephoto end thereof and the focal length thereof at a wide angle end thereof into a predetermined number.

14. An apparatus according to claim 9, wherein an output value regarding said object distance from said distance measuring unit is an inverse number of the object distance.

15. An apparatus according to claim 9, wherein the first output value from said distance measuring unit regarding said object distance is a value monotonously increasing or monotonously decreasing in proportion to said object distance.

* * * * *